US010023364B2

(12) United States Patent
Kawakami

(10) Patent No.: US 10,023,364 B2
(45) Date of Patent: Jul. 17, 2018

(54) HINGE STRUCTURE

(71) Applicant: KANTEC CO., LTD., Osaka (JP)

(72) Inventor: Koshiro Kawakami, Osaka (JP)

(73) Assignee: KANTEC CO., LTD., Osaka (JP)

( * ) Notice: Subject to any disclaimer, the term of this patent is extended or adjusted under 35 U.S.C. 154(b) by 0 days.

(21) Appl. No.: 15/540,233

(22) PCT Filed: Jan. 22, 2015

(86) PCT No.: PCT/JP2015/000287

§ 371 (c)(1),
(2) Date: Jun. 27, 2017

(87) PCT Pub. No.: WO2016/116965

PCT Pub. Date: Jul. 28, 2016

(65) Prior Publication Data

US 2018/0009578 A1 Jan. 11, 2018

(51) Int. Cl.
*E05F 1/08* (2006.01)
*B65D 43/24* (2006.01)
(Continued)

(52) U.S. Cl.
CPC ........... *B65D 43/24* (2013.01); *B65D 43/167* (2013.01); *F16C 11/04* (2013.01)

(58) Field of Classification Search
CPC ......... Y10T 16/53834; Y10T 16/53835; Y10T 16/53885; Y10T 16/53888; Y10T 16/5389; Y10T 16/53824; Y10T 16/53828; Y10T 16/5383; Y10T 16/547; B65D 43/24; B65D 43/16; B65D 43/163; B65D 43/167;
(Continued)

(56) References Cited

U.S. PATENT DOCUMENTS 1,387,833 A * 8/1921 Cheney ................. E05F 1/1016 16/DIG. 16
2,686,340 A * 8/1954 Davis, Jr. ............... A47B 41/02 105/378

(Continued)

FOREIGN PATENT DOCUMENTS

CN 1720380 A 1/2006
CN 2849077 Y 12/2006

(Continued)

OTHER PUBLICATIONS

International Search Report for the Application No. PCT/JP2015/000287 dated Apr. 28, 2015.

(Continued)

*Primary Examiner* — Chuck Mah
(74) *Attorney, Agent, or Firm* — Cheng Law Group, PLLC

(57) ABSTRACT

A hinge structure includes: a lower member which is to be attached to a container; an upper member which is to be attached to a lid; a rotary shaft connecting the lower member and the upper member to each other; and a link mechanism connecting the lower member and the upper member to each other at a position different from the position of the rotary shaft. The link mechanism includes a plurality of links pivotably connected to each other, and a spring mechanism of a torsion coil type configured to give spring force to the upper member in a direction in which the lid is opened.

4 Claims, 7 Drawing Sheets

9
21
2
413
22
422
411b
52
4113b
41 (411)
41 (412)
4
5
41 (411)
3
411a
42
51
421
4113a

(51) Int. Cl.
*B65D 43/16* (2006.01)
*F16C 11/04* (2006.01)

(58) Field of Classification Search
CPC ......... E05F 1/1207; E05F 1/1215; E05F 3/18; E05F 3/20
See application file for complete search history.

(56) References Cited

U.S. PATENT DOCUMENTS 2,894,276 A * 7/1959 Wulff .................... E05F 1/1284 16/308
3,001,227 A * 9/1961 Long .................. A47L 15/4261 16/290
3,665,958 A * 5/1972 Dunkelis ................. F16K 17/00 137/522
3,724,134 A * 4/1973 Verdone ................ E05F 1/1215 49/379
4,658,473 A * 4/1987 Schema ................ E05F 1/1261 16/286
5,301,390 A * 4/1994 Cleal ......................... E05D 3/06 16/285
5,301,469 A * 4/1994 Lyons, Sr. ............... E05F 1/123 16/308
5,394,650 A * 3/1995 Dean ...................... B65D 90/10 16/308
5,685,046 A * 11/1997 Neag ....................... E05D 3/127 16/366
6,955,133 B1 * 10/2005 Webster .................. B63B 19/12 114/201 R
7,635,171 B2 * 12/2009 Rapier, III ................ E05D 3/14 16/286
8,863,359 B1 * 10/2014 Krajenke ................ E05D 5/062 16/286
8,991,645 B2 * 3/2015 Hachadorian ........ H01R 13/447 220/4.02
9,131,825 B2 * 9/2015 Tameishi ............ A47L 15/0081
9,157,262 B2 * 10/2015 Lee ........................... E05D 3/12
9,415,907 B2 * 8/2016 Craig ..................... B65D 90/10
2006/0071481 A1 4/2006 Anzai
2007/0089270 A1 * 4/2007 Chang ....................... E05D 5/06 16/285
2007/0124893 A1 * 6/2007 Brustle ................. E05F 1/1075 16/296
2011/0095014 A1 * 4/2011 Choi .................. E05D 11/1028 219/409
2013/0305503 A1 * 11/2013 Weber ....................... E05D 5/00 29/11
2015/0291325 A1 * 10/2015 Chou ..................... B65D 43/26 220/23.91

FOREIGN PATENT DOCUMENTS

CN 201771308 U 3/2011
JP 6-8661 U 2/1994
JP 8-332849 A 12/1996
JP 2948538 B2 9/1999
JP 2004-1768 A 1/2004

OTHER PUBLICATIONS

English Translation of Notification of the First Office Action for the Application No. 201580073067.0 from The State Intellectual Property Office of the People's Republic of China dated Feb. 1, 2018.

* cited by examiner 4113b
52
41 (411)
41 (412)
41
4
5
41 (411)
42
51
4113a
422
411b
22
413
2
21
3
411a
421
9
4112
412
41 (412)
12
221
1
11
222
82
81
8

4
414
41 (411)
41 (412)
42
5
421
413
2
3
1
9
82
81
8

41 (412)
41 (411)
414
413
2
42
5
421
9
3
1
82
81
8

HINGE STRUCTURE

TECHNICAL FIELD

The present invention relates to hinge structures, and specifically to a hinge structure including a spring configured to assist an opening operation of a lid.

BACKGROUND ART

A hinge structure including a spring configured to assist an opening operation of a lid has been proposed (for example, see JP 2948538 B2 (hereinafter referred to as "Document 1")).

The hinge structure described in Document 1 is a structure in which a lower hinge piece which is to be attached to a container and an upper hinge piece which is to be attached to a lid are pivotably connected to each other via a shaft. This hinge structure includes a torsion coil spring located to surround the shaft and is configured to generate spring force for assisting the opening operation of the lid by the torsion coil spring.

Since the hinge structure described in Document 1 is a structure in which the spring force is generated by the torsion coil spring, it is possible to prevent the entire hinge structure from largely protruding from the lid.

SUMMARY OF INVENTION

It has been difficult in the above-described hinge structure to optimally vary the spring force for assisting the opening operation of the lid according to the position of the lid.

In view of the foregoing, it is an object of the present invention to provide a hinge structure which enables spring force of a torsion coil spring to be optimally varied according to the position of a lid, and a method for adjusting the hinge structure.

A hinge structure according to an aspect of the present invention includes: a lower member which is to be attached to a container; an upper member which is to be attached to a lid for closing an opening of the container; a rotary shaft pivotably connecting the lower member and the upper member to each other; and a link mechanism connecting the lower member and the upper member to each other at a position different from a position of the rotary shaft.

The link mechanism includes a plurality of links pivotably connected to each other and a spring mechanism of a torsion spring type configured to give the upper member spring force in a direction in which the lid is opened.

According to another configuration of the hinge structure according to the one aspect of the present invention, the plurality of links include a first link connected to the lower member via a shaft member. The spring mechanism is configured to vary the spring force according to a position of the first link with respect to the lower member.

According to another configuration of the hinge structure according to the one aspect of the present invention, the link mechanism is configured to change the position of the first link with respect to the lower member to vary the spring force such that the lid rests in an arbitrary position.

According to another configuration of the hinge structure according to the one aspect of the present invention, the plurality of links further include a second link connected to the first link and the upper member.

According to another configuration of the hinge structure according to the one aspect of the present invention, the shaft member includes a first end protruding beyond the first link on one side and a second end protruding on a side opposite to the first end. The spring mechanism includes a first torsion coil spring and a second torsion coil spring. The first torsion coil spring is located to surround an outer periphery of the first end. The second torsion coil spring is located to surround an outer periphery of the second end.

According to another configuration of the hinge structure according to the one aspect of the present invention, the plurality of links are located between the first torsion coil spring and the second torsion coil spring when viewed in plan view.

A method for adjusting the hinge structure according to the one aspect of the present invention includes: setting a length of the second link in accordance with a dimensional shape and a weight of the lid; and adjusting the spring force such that the lid rests in an arbitrary position.

DESCRIPTION OF EMBODIMENT

The present invention will be described based on an embodiment illustrated in the attached drawings.

Figures 1A, 1B:
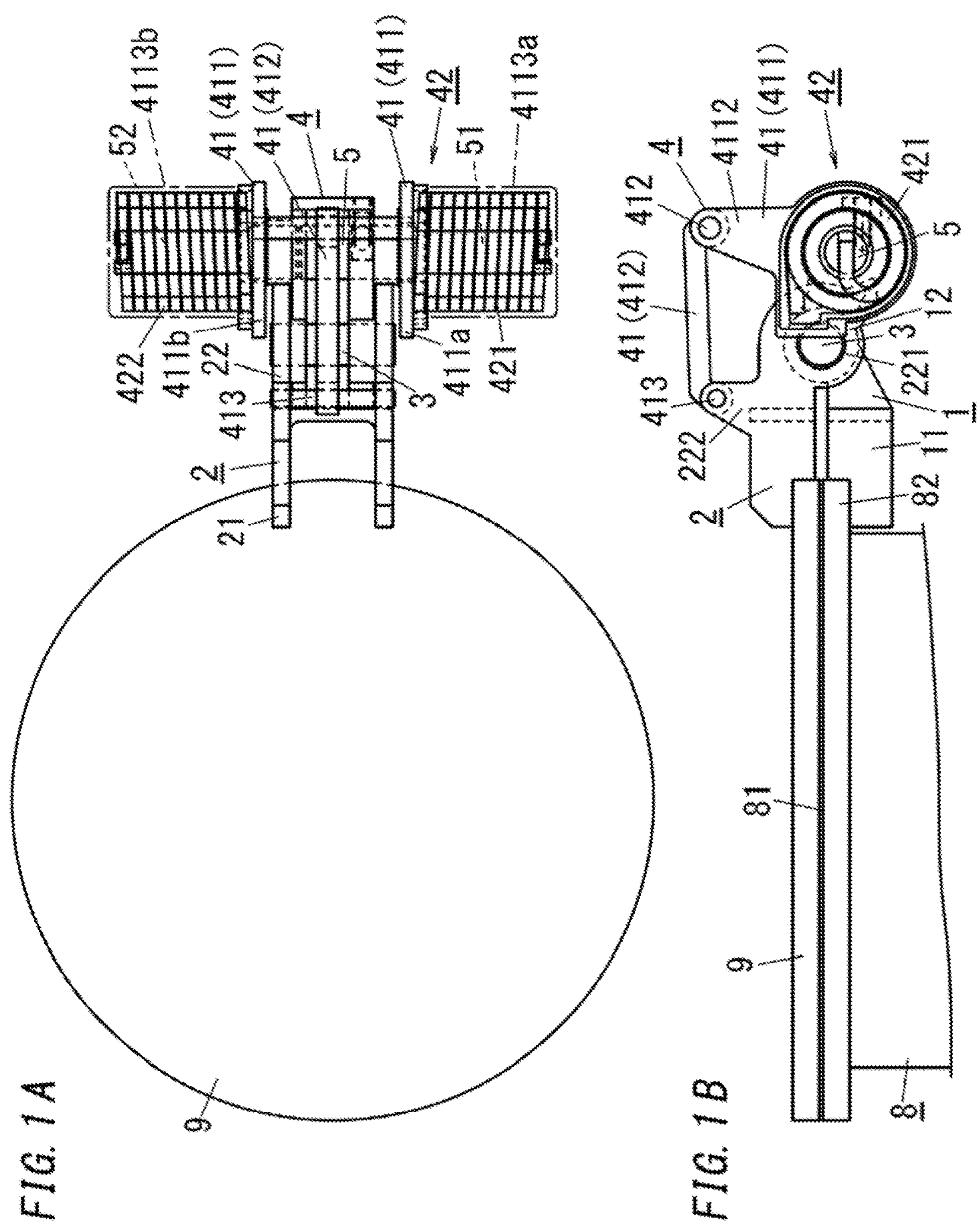
FIG. 1A is a plan view illustrating a hinge structure of an embodiment in a state in which the hinge structure is attached to a container and a lid.
FIG. 1B is a side view illustrating the hinge structure of the embodiment in the state in which the hinge structure is attached to the container and the lid.

FIGS. 1A and 1B illustrate a state in which a hinge structure of one embodiment is attached to a container 8 and a lid 9. In this state, the lid 9 closes an opening 81 at an upper end of the container 8. The state illustrated in FIGS. 1A and 1B is a state in which the lid 9 is at an angle of the opening position of 0°.

The hinge structure of the present embodiment includes a lower member 1, an upper member 2 located above the lower member 1, a rotary shaft 3 pivotably connecting the lower member 1 and the upper member 2 to each other, and a link mechanism 4 connecting the lower member 1 and the upper member 2 to each other. The lid 9 pivots about the rotary shaft 3.

First, the lower member 1 will be described.

The lower member 1 is a member which is to be fixed to a flange 82 provided at the upper end of the container 8.

Figure 3A:
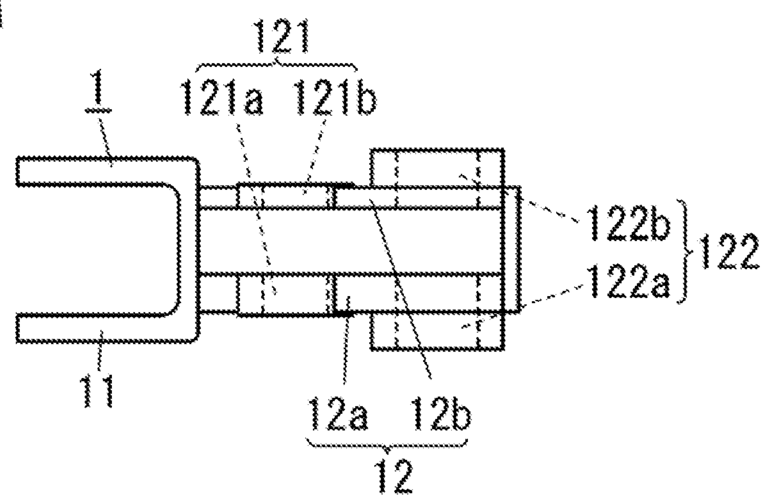
FIG. 3A is a plan view illustrating a lower member included in the hinge structure of the embodiment.
Figure 3B:
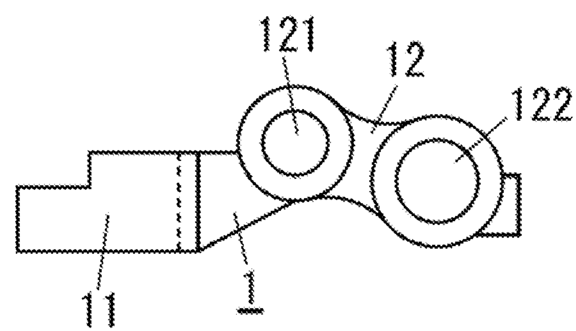
FIG. 3B is a side view illustrating the lower member included in the hinge structure of the embodiment.
Figure 4A:
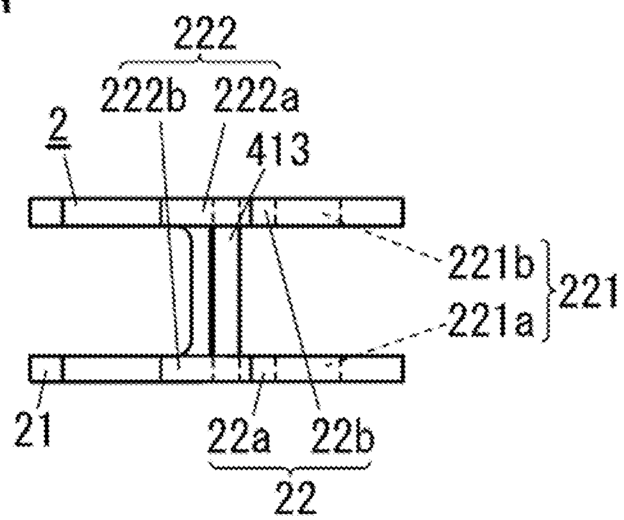
FIG. 4A is a plan view illustrating an upper member included in the hinge structure of the embodiment.
Figure 4B:
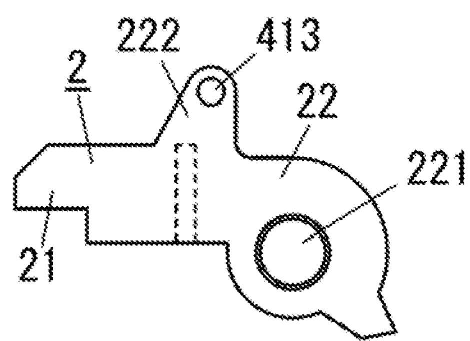
FIG. 4B is a side view illustrating the upper member included in the hinge structure of the embodiment.

As illustrated in FIGS. 1B, 3A, and 3B, the lower member 1 integrally includes: a fixing part 11 which is to be immovably attached to the flange 82; and a connection part 12 connected to the upper member 2 and the link mechanism 4.

The connection part 12 has a first through hole 121 and a second through hole 122 formed in different positions. The rotary shaft 3 is inserted through the first through hole 121. A shaft member 5 which will be described later is inserted through the second through hole 122. The first through hole 121 and the second through hole 122 are located in parallel to each other. The first through hole 121 is located in front of the second through hole 122 and slightly above the second through hole 122. That is, the first through hole 121 is located in front of and obliquely above the second through hole 122.

The positional relationship between the first through hole 121 and the second through hole 122 is not limited to the above-described positional relationship. For example, the first through hole 121 may be located in front of the second through hole 122 and at the same height as the second through hole 122.

Note that in the description, the forward direction refers to a direction in which the container 8 is located with respect to the hinge structure of the present embodiment, and the rearward direction is a direction opposite to the forward direction. The lower member 1 and the upper member 2 are located behind the container 8. The right and left direction is a direction which is orthogonal to the forward and rearward direction. The first through hole 121 and the second through hole 122 penetrate through the connection part 12 in the right and left direction.

In the lower member 1 of the present embodiment, the connection part 12 located behind the fixing part 11 is divided into a left connection part 12*a* and a right connection part 12*b*, thereby reducing the weight of the connection part 12. The left connection part 12*a* and the right connection part 12*b* are located at a distance from each other in the right and left direction and are parallel to each other. Note that the connection part 12 of the lower member 1 does not have to be divided into the left connection part 12*a* and the right connection part 12*b*. A structure in which the connection part 12 is not divided into right and left connection parts may be used.

The left connection part 12*a* has a left first through hole 121*a* and a left second through hole 122*a*. The right connection part 12*b* has a right first through hole 121*b* and a right second through hole 122*b*.

The left first through hole 121*a* and the right first through hole 121*b* are located in alignment with each other and at a distance from each other in the right and left direction. The left first through hole 121*a* and the right first through hole 121*b* form the first through hole 121 through which the rotary shaft 3 is inserted. The left second through hole 122*a* and the right second through hole 122*b* are located in alignment with each other and at a distance from each other in the right and left direction. The left second through hole 122*a* and the right second through hole 122*b* form the second through hole 122 through which the shaft member 5 is inserted.

Next, the upper member 2 will be described.

The upper member 2 is a member which is to be fixed to the lid 9 configured to close the opening 81 of the container 8.

As illustrated in FIGS. 1A, 1B, 4A, and 4B, the upper member 2 integrally includes: a fixing part 21 which is to be immovably attached to a peripheral portion of the lid 9; and a connection part 22 connected to the lower member 1 and the link mechanism 4.

The connection part 22 has a through hole 221 through which the rotary shaft 3 is inserted. The connection part 22 includes a connector 222 connected to the link mechanism 4. The through hole 221 and the connector 222 are provided at different positions. In a state in which the lid 9 is at an angle of the opening position of 0°, the connector 222 is located in front of and obliquely above the through hole 221.

The positional relationship between the connector 222 and the through hole 221 is not limited to the above-described positional relationship. For example, a pin 413 which will be described later and is inserted through the connector 222 may be located directly above the through hole 221.

In the upper member 2 of the present embodiment, the connection part 22 located behind the fixing part 21 in a state in which the angle of the opening position is 0° is divided into a left connection part 22*a* and a right connection part 22*b*. The left connection part 22*a* and the right connection part 22*b* are located at a distance from each other in the right and left direction and are parallel to each other. Note that the connection part 22 of the upper member 2 does not have to be divided into the left connection part 22*a* and the right connection part 22*b*. A structure in which the connection part 22 is not divided into right and left connection parts may be used.

The left connection part 22*a* has a left through hole 221*a* and includes a left connection piece 222*a*. The right connection part 22*b* has a right through hole 221*b* and includes a right connection piece 222*b*.

The left through hole 221*a* and the right through hole 221*b* are located in alignment with each other and at a distance from each other in the right and left direction, and the left and right through holes 221*a* and 221*b* together form the through hole 221. The left connection piece 222*a* and the right connection piece 222*b* are located at a distance from each other in the right and left direction, and the left and right connection pieces 222*a* and 222*b* together form the connector 222. The pin 413 is inserted through the left connection piece 222*a* and the right connection piece 222*b*.

Next, the link mechanism 4 will be described.

The link mechanism 4 is a mechanism connecting the lower member 1 and the upper member 2 to each other at a position different from the position of the rotary shaft 3. The link mechanism 4 includes a pair of links 41 pivotably connected to each other and a spring mechanism 42 of a torsion spring type. The link mechanism 4 may include three or more links 41.

One of the links 41 in the pair is a first link 411 which is connected to the lower member 1 via the shaft member 5 at one degree of freedom. The other of the links 41 in the pair is a second link 412 which is connected to the first link 411 and the upper member 2 at one degree of freedom.

Figure 6A:
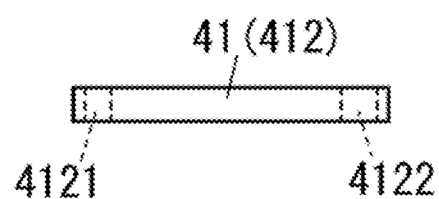
FIG. 6A is a plan view illustrating a second link included in the hinge structure of the embodiment.
Figure 6B:
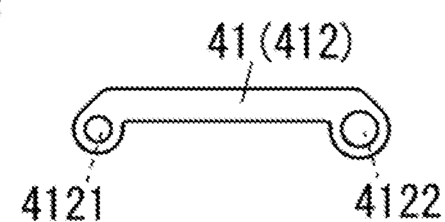
FIG. 6B is a side view illustrating the second link included in the hinge structure of the embodiment.

As illustrated in FIGS. 6A and 6B, the second link 412 is an arm-like member provided with connection holes 4121 and 4122 on both ends in the longitudinal direction of the second link 412. The second link 412 is connected to the connector 222 of the upper member 2 at one degree of freedom by inserting the pin 413 through the connection hole 4121.

Figure 5A:
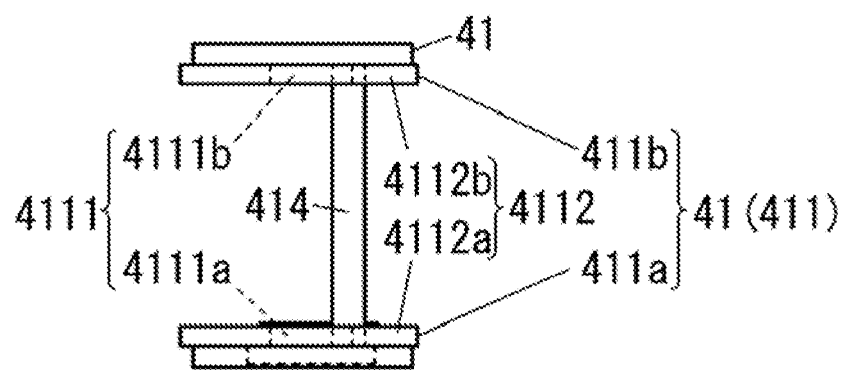
FIG. 5A is a plan view illustrating a first link included in the hinge structure of the embodiment.
Figure 5B:
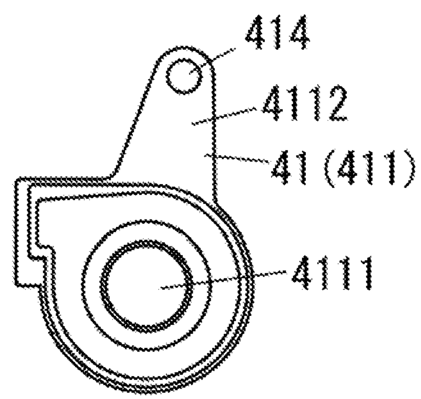
FIG. 5B is a side view illustrating the first link included in the hinge structure of the embodiment.

As illustrated in FIGS. 5A and 5B, the first link 411 has a through hole 4111 through which the shaft member 5 is inserted, and the first link 411 includes a connector 4112 connected to the second link 412. The through hole 4111 and the connector 4112 are located at different positions of the first link 411. In a state in which the lid 9 is at an angle of the opening position of 0°, the connector 4112 is located above the through hole 4111.

In the link mechanism 4 of the present embodiment, the first link 411 is divided into a left link half part 411*a* and a right link half part 411*b*. The left link half part 411*a* and the right link half part 411*b* are located at a distance from each other in the right and left direction and are in parallel to each other. Note that the first link 411 does not have to be divided into the left link half part 411*a* and the right link half part 411*b*. A structure in which the first link 411 is not divided into right and left link half parts may be used.

The left link half part 411*a* has a left through hole 4111*a* and includes a left connection piece 4112*a*. The right link half part 411*b* has a right through hole 4111*b* and includes a right connection piece 4112*b*.

The left through hole 4111*a* and the right through hole 4111*b* are located in alignment with each other and at a distance from each other in the right and left direction, and the left and right through holes 4111*a* and 4111*b* together form the through hole 4111. The left connection piece 4112*a* and the right connection piece 4112*b* are located at a distance from each other in the right and left direction, and the left and right connection pieces 4112*a* and 4112*b* together form the connector 4112.

Through the left connection piece 4112*a* and the right connection piece 4112*b*, a pin 414 is inserted. The first link 411 and the second link 412 are pivotably connected to each other via the pin 414 at one degree of freedom.

Moreover, the link mechanism 4 of the present embodiment includes the spring mechanism 42 of a torsion coil type (a torsion spring type) configured to give spring force to the upper member 2 which is to support the lid 9.

The spring mechanism 42 includes a first torsion coil spring 421 and a second torsion coil spring 422. Since the first torsion coil spring 421 and the second torsion coil spring 422 are both located to surround an outer periphery of the shaft member 5, it is possible to prevent the entire spring mechanism 42 from largely protruding from the lid 9 in the rearward direction (see FIG. 1A).

As illustrated in FIG. 1A, the shaft member 5 includes a first end 51 and a second end 52 on opposite sides. The first end 51 is an end further protruding in the left direction beyond the left link half part 411*a* included in the first link 411. The second end 52 is an end further protruding in the right direction beyond the right link half part 411*b* included in the first link 411.

The first torsion coil spring 421 is located to surround an outer periphery of the first end 51 of the shaft member 5. The first torsion coil spring 421 has one end which abuts on the left link half part 411*a* and is locked, and the first torsion coil spring 421 has the other end which abuts on the first end 51 and is locked. In the present embodiment, the first torsion coil spring 421 is exposed, but a cover 4113*a* as indicated by an imaginary line in FIG. 1A is preferably attached to the left link half part 411*a* to store the first torsion coil spring 421 in the cover 4113*a*.

The second torsion coil spring 422 is located to surround an outer periphery of the second end 52 of the shaft member 5. The second torsion coil spring 422 has one end which abuts on the right link half part 411*b* and is locked, and the second torsion coil spring 422 has the other end which abuts on the second end 52 and is locked. In the present embodiment, the second torsion coil spring 422 is exposed, but a cover 4113*b* as indicated by an imaginary line in FIG. 1A is preferably attached to the right link half part 4111*b* to store the second torsion coil spring 422 in the cover 4113*b*.

Here, the shaft member 5 is fixed to the lower member 1 so as not to pivot with respect to the lower member 1. That is, the first end 51 is fixed to the lower member 1 so as not to pivot with respect to the lower member 1. Therefore, when the first link 411 pivots around the shaft member 5, and the position of the first link 411 changes, the first torsion coil spring 421 deforms along with the change of the position of the first link 411, thereby varying spring force which the first torsion coil spring 421 exerts. Similarly, the second end 52 is fixed to the lower member 1 so as not to pivot with respect to the lower member 1. Therefore, when the first link 411 pivots around the shaft member 5, and the position of the first link 411 changes, the second torsion coil spring 422 deforms along with the change of the position of the first link 411, thereby varying spring force which the second torsion coil spring 422 exerts.

The first torsion coil spring 421 and the second torsion coil spring 422 together give spring force via the first link 411 and the second link 412 to the upper member 2 in a direction in which the lid 9 is opened (i.e., in a direction in which the lid 9 is pulled up in the rearward direction). The spring force which the first torsion coil spring 421 and the second torsion coil spring 422 give to the upper member 2 is spring force which the spring mechanism 42 gives to the upper member 2 so as to assist an opening operation of the lid 9.

Figure 2A:
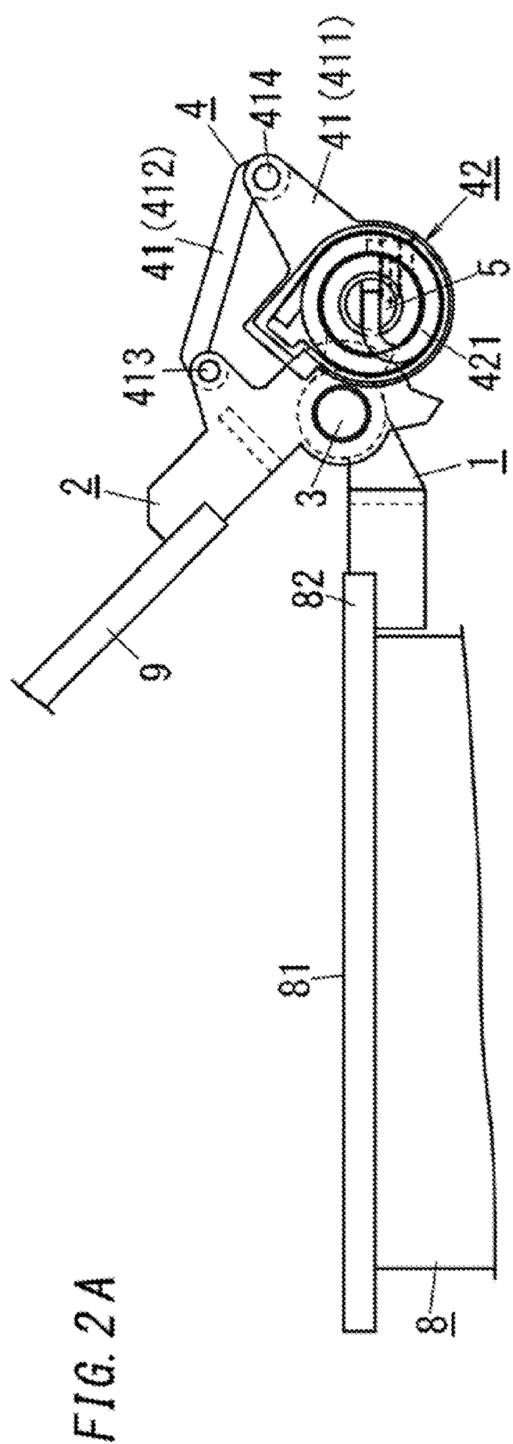
FIG. 2A is a plan view illustrating the hinge structure of the embodiment in a state in which the hinge structure is attached to the container and lid and the lid is opened at 45°.
Figure 2B:
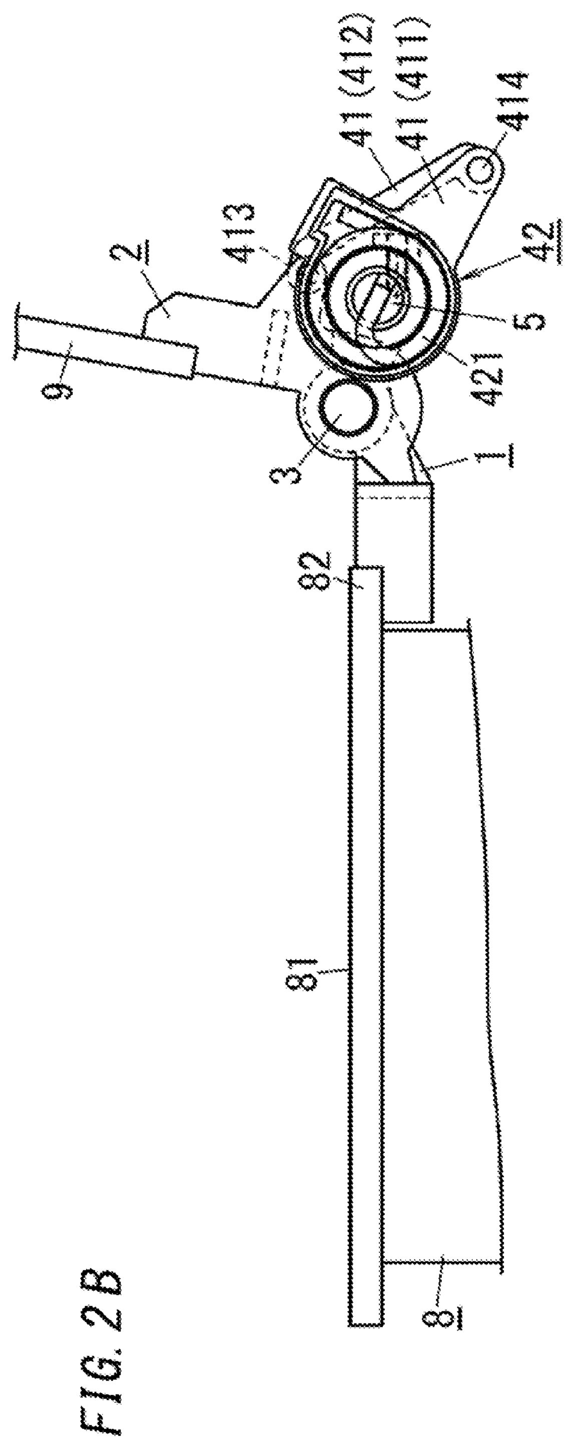
FIG. 2B is a plan view illustrating the hinge structure of the embodiment in a state in which the hinge structure is attached to the container and the lid and the lid is opened at 100°.

As described above, FIG. 1B shows a state in which the lid 9 is at an angle of the opening position of 0°, and FIG. 2A shows a state in which the lid 9 is at an angle of the opening position of 45° (i.e., a state in which the lid 9 is opened at 45° about the rotary shaft 3), and FIG. 2B shows a state in which the lid 9 is at an angle of the opening position of 100° (i.e., a state in which the lid 9 is opened at 100° about the rotary shaft 3).

In the hinge structure of the present embodiment, the spring force for assisting the opening operation of the lid 9 varies according to the position of the first link 411 with respect to the lower member 1. How the position of the first link 411 changes along with opening/closing of the lid 9 is adjustable by adjusting the length of the second link 412.

Therefore, the length of the second link 412 and/or the spring force of the spring mechanism 42 are set according to the dimensional shape and/or the weight of the lid 9, and thereby, the spring force which the spring mechanism 42 exerts so as to assist the opening operation of the lid 9 can be gradually varied to an optimal magnitude corresponding to the angle of the opening position of the lid 9.

Figure 7:
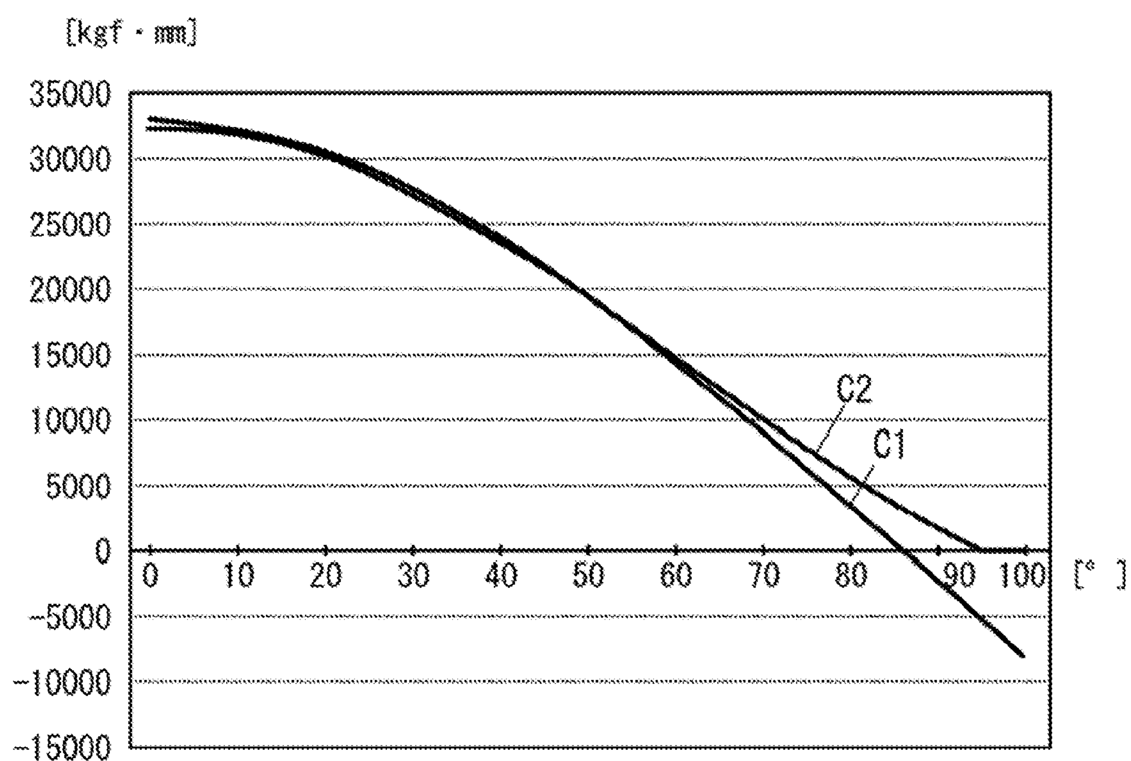
FIG. 7 is a graph illustrating how a torque assisting an opening operation of the lid varies according to the angle of the opening position of the lid.

FIG. 7 is a graph of an example showing how the spring force of the spring mechanism 42 varies. The abscissa in FIG. 7 represents the angle [°] of the opening position of the lid 9. The ordinate represents the torque [kgf·mm]. The curve C1 in FIG. 7 shows how a torque required to maintain the position of the lid 9 gradually varies according to the angle of the opening position of the lid 9. The curve C2 in FIG. 7 shows how a torque exerted by the spring mechanism 42 so as to assist the opening operation of the lid 9 gradually varies according to the angle of the opening position of the lid 9.

In the hinge structure of the present embodiment, as illustrated in FIG. 7, the curve C2 of the torque which acts so as to assist the opening operation of the lid 9 is set to be approximate with the curve C1 of the torque required to maintain the position of the lid 9. In this way, it becomes possible to set the torque such that the lid 9 rests at an arbitrary angle of the opening position within a predetermined range (e.g., within a range of 0° to 85° of the angle of the opening position) from a state in which the lid 9 is closed and such that the lid 9 automatically falls in the rearward direction when the angle of the opening position of the lid 9 exceeds the predetermined range. In other words, the hinge structure of the present embodiment can be a so-called "free stop hinge."

Note that when the known hinge mechanism described in Document 1 is used, the torque for assisting an opening operation of the lid linearly decreases as the angle of the opening position of the lid increases. Therefore, the known hinge structure has been difficult to be formed as a free stop hinge.

As described above, the hinge structure of the present embodiment includes: the lower member 1 which is to be attached to the container 8; the upper member 2 which is to be attached to the lid 9 for closing the opening 81 of the container 8; the rotary shaft 3 pivotably connecting the lower member 1 and the upper member 2 to each other; and the link mechanism 4 connecting the lower member 1 and the upper member 2 to each other at a position different from the position of the rotary shaft 3. The link mechanism 4 includes the plurality of links 41 pivotably connected to each other and the spring mechanism 42 of a torsion coil type configured to give the upper member 2 spring force in a direction in which the lid 9 is opened.

In the hinge structure of the present embodiment, the spring mechanism 42 is a torsion coil, and therefore, it is possible to prevent the spring mechanism 42, and the like from largely protruding from the lid 9 in the rearward direction. In addition, the spring mechanism 42 is provided to the link mechanism 4 connecting the lower member 1 and the upper member 2 to each other unlike the known technique according to which a spring is provided to the rotary shaft 3. Therefore, the spring force exerted by the spring mechanism 42 can be optimally varied according to the position of the lid 9.

In the hinge structure of the present embodiment, the plurality of links 41 include the first link 411 connected to the lower member 1 via the shaft member 5. The spring mechanism 42 is configured to vary the spring force according to the position of the first link 411 with respect to the lower member 1.

Therefore, in the hinge structure of the present embodiment, the position of the first link 411 is changed according to the position of the lid 9, and according to the position of the first link 411, the spring force exerted by the spring mechanism 42 can be varied.

In the hinge structure of the present embodiment, the link mechanism 4 is configured to change the position of the first link 411 with respect to the lower member 1 to vary the spring force such that the lid 9 rests in an arbitrary position.

Therefore, according to the hinge structure of the present embodiment, a free stop hinge can be realized with a compact mechanism which prevents the spring mechanism 42 from largely protruding from the lid 9 in the rearward direction.

In the hinge structure of the present embodiment, the plurality of links 41 further include the second link 412 connected to the first link 411 and the upper member 2.

Accordingly, in the hinge structure of the present embodiment, setting the length of the second link 412 enables optimal assistance of opening operations of a various types of lids 9, and therefore, the hinge structure is highly versatile.

In the hinge structure of the present embodiment, the shaft member 5 includes the first end 51 protruding beyond the first link 411 on one side and the second end 52 protruding on a side opposite to the first end 51. The spring mechanism 42 includes the first torsion coil spring 421 and the second torsion coil spring 422. The first torsion coil spring 421 is located to surround the outer periphery of the first end 51. The second torsion coil spring 422 is located to surround the outer periphery of the second end 52. The plurality of links 41 are located between the first torsion coil spring 421 and the second torsion coil spring 422 when viewed in plan view (i.e., when viewed from above).

Therefore, the hinge structure of the present embodiment has advantages that the entire structure is compact and that few restrictions are imposed on, for example, the attachment space of the hinge structure.

Moreover, the method for adjusting the hinge structure of the present embodiment includes: setting the length of the second link 412 in accordance with the dimensional shape and the weight of the lid 9; and adjusting the spring force such that the lid 9 rests in an arbitrary position.

Therefore, the method for adjusting the hinge structure of the present embodiment enables realization of a free stop hinge for a variety of types of lids 9 by simple work. Moreover, it is possible to realize a free stop hinge for a variety of types of lids 9 at low cost.

The present invention has been described with reference to the embodiment illustrated in the attached drawings but is not limited to the embodiment. Without departing from the intended scope of the present invention, the configurations of the respective embodiments may be accordingly modified.

The invention claimed is:

1. A hinge structure, comprising:

a lower member which is to be attached to a container having an opening at an upper end of the container;

an upper member which is to be attached to a lid for closing the opening of the container;

a rotary shaft pivotably connecting the lower member and the upper member to each other; and a link mechanism connecting the lower member and the upper member to each other at a position different from a position of the rotary shaft, wherein the link mechanism includes a plurality of links pivotably connected to each other; and a spring mechanism of a torsion coil spring type configured to give the upper member spring force in a direction in which the lid is pulled up and opened, the plurality of links include a shaft member located at the position different from the position of the rotary shaft, and a first link pivotably connected to the lower member via the shaft member, the shaft member includes a first end protruding beyond the first link on one side, and a second end protruding on a side opposite to the first end, the spring mechanism includes a first torsion coil spring, and a second torsion coil spring, the first torsion coil spring is located to surround an outer periphery of the first end, the second torsion coil spring is located to surround an outer periphery of the second end, and the spring mechanism is configured to vary the spring force according to a position of the first link with respect to the lower member such that the lid rests in an arbitrary position.

2. The hinge structure according to claim 1, wherein the plurality of links further includes a second link connected to the first link and the upper member.

3. The hinge structure according to claim 1, wherein the plurality of links is located between the first torsion coil spring and the second torsion coil spring when viewed in plan view.

4. A method for adjusting the hinge structure according to claim 2, the method comprising:

setting a length of the second link in accordance with a dimensional shape and a weight of the lid; and adjusting the spring force such that the lid rests in an arbitrary position.

* * * * *